United States Patent [19]

Byrd

[11] Patent Number: 5,345,084
[45] Date of Patent: Sep. 6, 1994

[54] DIRECTIONAL FAST-NEUTRON DETECTOR

[75] Inventor: Roger C. Byrd, Albuquerque, N. Mex.

[73] Assignee: The United States of America as represented by the United States Department of Energy, Washington, D.C.

[21] Appl. No.: 38,320

[22] Filed: Mar. 29, 1993

[51] Int. Cl.$^5$ .............................................. G01T 3/06
[52] U.S. Cl. .............................. 250/390.12; 250/366; 250/390.11
[58] Field of Search .................. 250/366, 390.12, 367, 250/390.11

[56] References Cited

U.S. PATENT DOCUMENTS

| | | | |
|---|---|---|---|
| 3,436,539 | 4/1969 | Wilcox | 250/366 |
| 3,539,806 | 11/1970 | Humphrey | 250/366 |
| 4,169,979 | 10/1979 | Arnold et al. | 250/266 |
| 4,172,226 | 10/1979 | Rubin | 250/366 |
| 4,259,575 | 3/1981 | LeVert et al. | 250/336.1 |

OTHER PUBLICATIONS

C. Feldman et al., "A Novel Fast-Neutron Detector For Space Applications," A306 Nuclear Instruments and Methods in Physics Research, pp. 350–365 (1991).

William Baird et al., "A Solid State Directional Gamma Detector," IEEE Transactions on Nuclear Science 1, vol. NS-33 (Feb. 1986).

E. L. Chupp et al., "A Directional Neutron Detector For Space Research Use," IEEE Transactions on Nuclear Science, pp. 468–477 (Feb. 1966).

R. F. Stetson et al., "A Directional Scintillation Counter For Neutrons," 6 Nuclear Instruments and Methods, pp. 94–95 (1960).

*Primary Examiner*—Carolyn E. Fields
*Attorney, Agent, or Firm*—Ray G. Wilson; William A. Eklund; William R. Moser

[57] ABSTRACT

A plurality of omnidirectional radiation detectors are arranged in a close packed symmetrical pattern to form a segmented detector. The output radiation counts from these detectors are arithmetically combined to provide the direction of a source of incident radiation. Directionality is achieved without the use of shielding to provide collimation and background reduction effects. Indeed, output counts from paired detectors are simply subtracted to yield a vector direction toward the radiation source. The counts from all of the detectors can be combined to yield an output signal functionally related to the radiation source strength.

4 Claims, 4 Drawing Sheets

DIRECTIONAL FAST-NEUTRON DETECTOR

BACKGROUND OF THE INVENTION

This invention relates to radiation detectors and, more particularly, to radiation detectors that provide the direction of the source of the radiation. This invention was made with government support under Contract No. W-7405-ENG-36 awarded by the U.S. Department of Energy. The government has certain rights in the invention.

There are numerous instances where it is desirable to determine the direction from an observer of a radiation source, e.g., fast neutrons, etc. A wide range of techniques has been used to provide detectors with a directional capability. One commonly used directional detector is a collimated instrument where shielding is used to restrict the angular acceptance of radiation by the detector and to reduce background contributions from other directions. Thus, a maximum output is obtained when an aperture in the shielding is aligned with a radiation source. In some instances, a rotating collimator aperture or multiple apertures are used to obtain source direction information.

Other directional detector designs use filament-type detectors to obtain directional information. E. L. Chupp et al., "A Direction Neutron Detector for Space Research Use", IEEE Transactions on Nuclear Science NS-13, pp. 468-477 (Feb. 1966), teaches aligning the filament axes toward the radiation source to provide a directional output. R. F. Stetson et al., "A Directional Scintillation Counter for Neutrons", 6 Nuclear Instruments and Methods, pp. 94-95 (1960), suggests the use of an array of filament arrays that use the forward-peaked angular distribution of protons from n-p collisions to obtain directional effects.

In many applications, weight and portability are important considerations in selecting a detector. For example, space applications require light weight devices, and simplicity is desired since repair is not feasible. These same considerations are also applicable to mobile detectors, particularly hand held devices or devices that might require access to restricted locations.

The present invention addresses these considerations and a directional detector is formed from four unshielded detectors where a simple analysis of the detector outputs provides a vector indicating the direction and strength of a radiation source.

Accordingly, it is an object of the present invention to provide an uncollimated directional detector.

It is another object of the present invention to enable the direction of a radiation source to be determined from a simple algorithm.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the apparatus of this invention may consist essentially of a plurality of omnidirectional radiation detectors arranged in close packed relationship to form a segmented symmetric detector. A processor combines arithmetically the incident radiation counts from the plurality of detectors to output a signal functionally related to a direction of a source for said radiation.

In one embodiment, four detectors are arranged in paired relationship with front-back and left-right symmetry. Output radiation counts are combined by subtracting counts from the detectors having front-back symmetry and subtracting counts from the detectors having left right symmetry. The resulting differences form a vector quantity indicating the direction for the source of the radiation. Small shielding segments may be provided between adjacent detectors to attenuate radiation passing between adjacent ones of the detectors.

BRIEF DESCRIPTION OF THE DRAWINGS

The accompanying drawings, which are incorporated in and form a part of the specification, illustrate embodiments of the present invention and, together with the description, serve to explain the principles of the invention. In the drawings.

DETAILED DESCRIPTION OF THE DRAWINGS

In accordance with the present invention, a plurality of omnidirectional radiation detectors, i.e., detectors that detect incident radiation independent of the direction of that radiation, can be arranged in a close packed symmetrical pattern to form a segmented detector. As used herein, close packed means that adjacent non-paired detectors are abutting along their longitudinal axes. The output radiation counts from those detectors can be combined to provide the direction of a source of incident radiation. Directionality is achieved without the use of shielding to provide collimation and background reduction effects. Indeed, the output counts from paired detectors are simply subtracted to yield a vector direction toward the radiation source. The counts from all of the detectors can be combined to yield an output signal functionally related to the strength of the radiation source.

Figure 1:
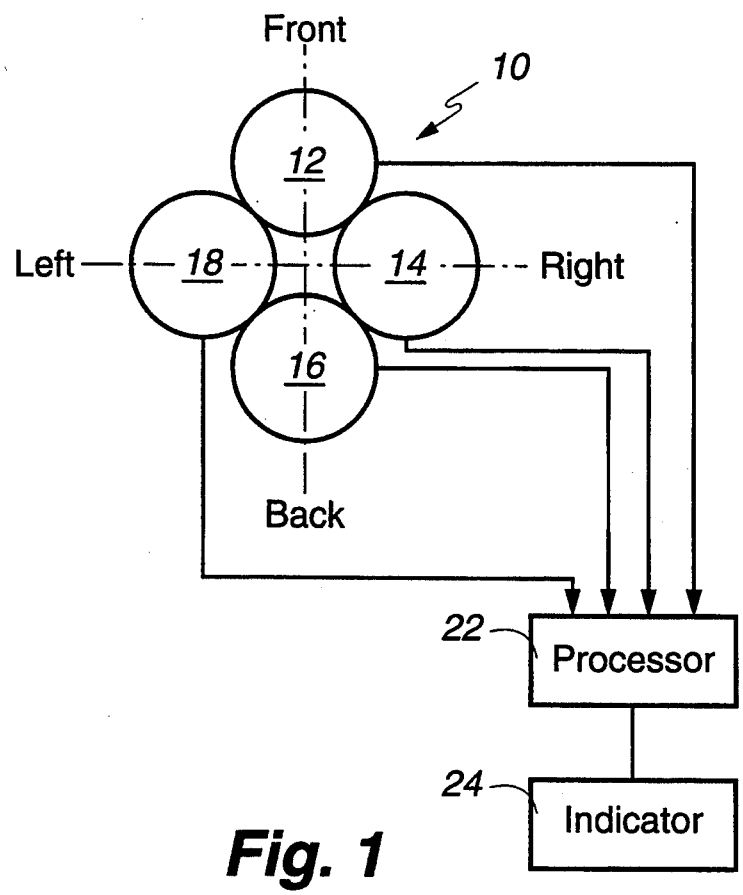
FIG. 1 is a schematic of a directional detector in block diagram form.

In one embodiment, radiation detectors are arranged along orthogonal axes as shown in FIG. 1 to form segmented detector 10. In the embodiment described herein, a radiation source of fast neutrons will be assumed since unexpected simplifications are obtained using the present invention to determine the direction of a fast neutron source. Detectors 12 and 16 are aligned along a first axis, hereinafter called the front-back axis, and detectors 14 and 18 are aligned along a second axis, hereinafter called the right-left axis, orthogonal to the first axis. One suitable omnidirectional detector is a borated plastic scintillator rod, marketed by Bicron Corporation as BC454, that is viewed from each end by a photomultiplier tube (e.g., RCA 4900). Detectors 12, 14, 16, and 18 have generally parallel axes and each detector abuts adjacent detectors oriented along their axes, i.e., detector 12 abuts detectors 14 and 18, etc.

The outputs from detectors 12, 14, 16, and 18 are input to processor 22. Processor 22 is a simple electronic circuit or microcomputer for arithmetically combining the detector outputs. In accordance with the present invention, it has been found that the outputs from paired detectors are subtracted and the resulting numbers form a vector in the direction of the radiation source. That is, the output from detector 16 is subtracted from the output from detector 12 to form a front-back vector quantity and the output from detector 18 is subtracted from 14 to form a right-left vector quantity. It will be recognized that the order of subtraction is not important as long as it is consistent with the directions defined as "front" or "right". Normalizing the differences to an average of the four counter outputs gives a source direction; leaving out the normalization allows the length of the vector to indicate the magnitude of the asymmetry of the flux. Distant sources are detected primarily by the attenuation through the detectors, while nearby sources also have a $1/r^2$ fall off with distance. The vector quantities formed by processor 22 may then be input to a direction indicator 24 to provide a conventional directional indication, e.g., relative or absolute bearing, derived from the vector quantities.

Figure 3:
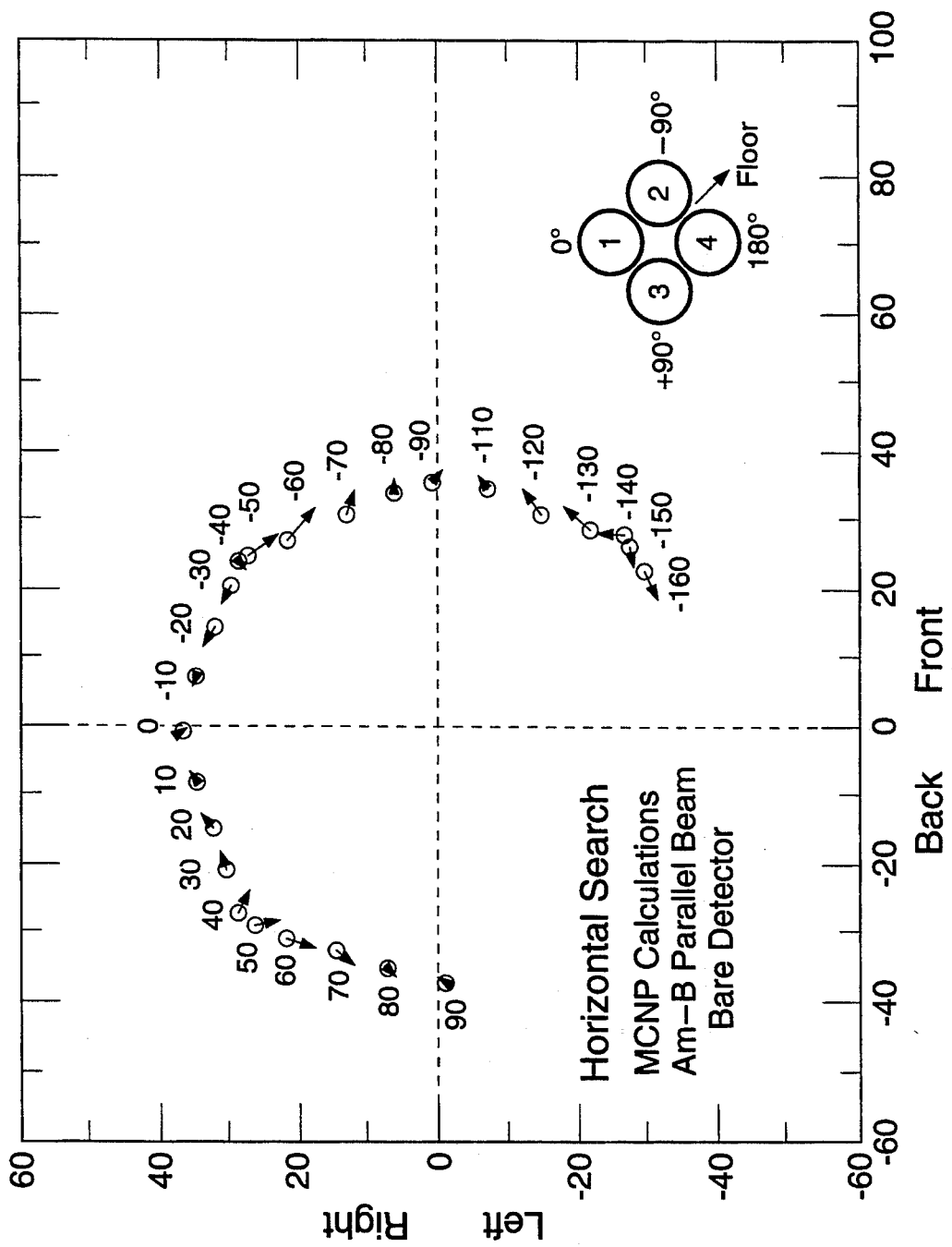
FIG. 3 graphically depicts the simulated performance of a detector as shown in FIG. 1 with a parallel beam radiation source.

FIG. 3 graphically depicts the calculated accuracy of the system shown in FIG. 1 as a distant (parallel beam) Am-B fast neutron source is moved about segmented direction detector 10. The calculated direction vector was formed from the right-left asymmetry $y=N_2-N_3$ and the front-back asymmetry $x=N_1-N_4$. The small circles are centered at the (x,y) coordinates estimated by the detector; the circle radii indicate the statistical uncertainty. The arrows point in the direction of the true source location, where the arrow tip indicates the source. Thus, the arrows' lengths and directions indicate the error in the estimate of the source at the indicated location. Serious disagreements (i.e., about 10°) occur only around some of the 45° angles, that is, just away from the angles passing between the rods, where significant neutron leakage might occur.

Figure 4:
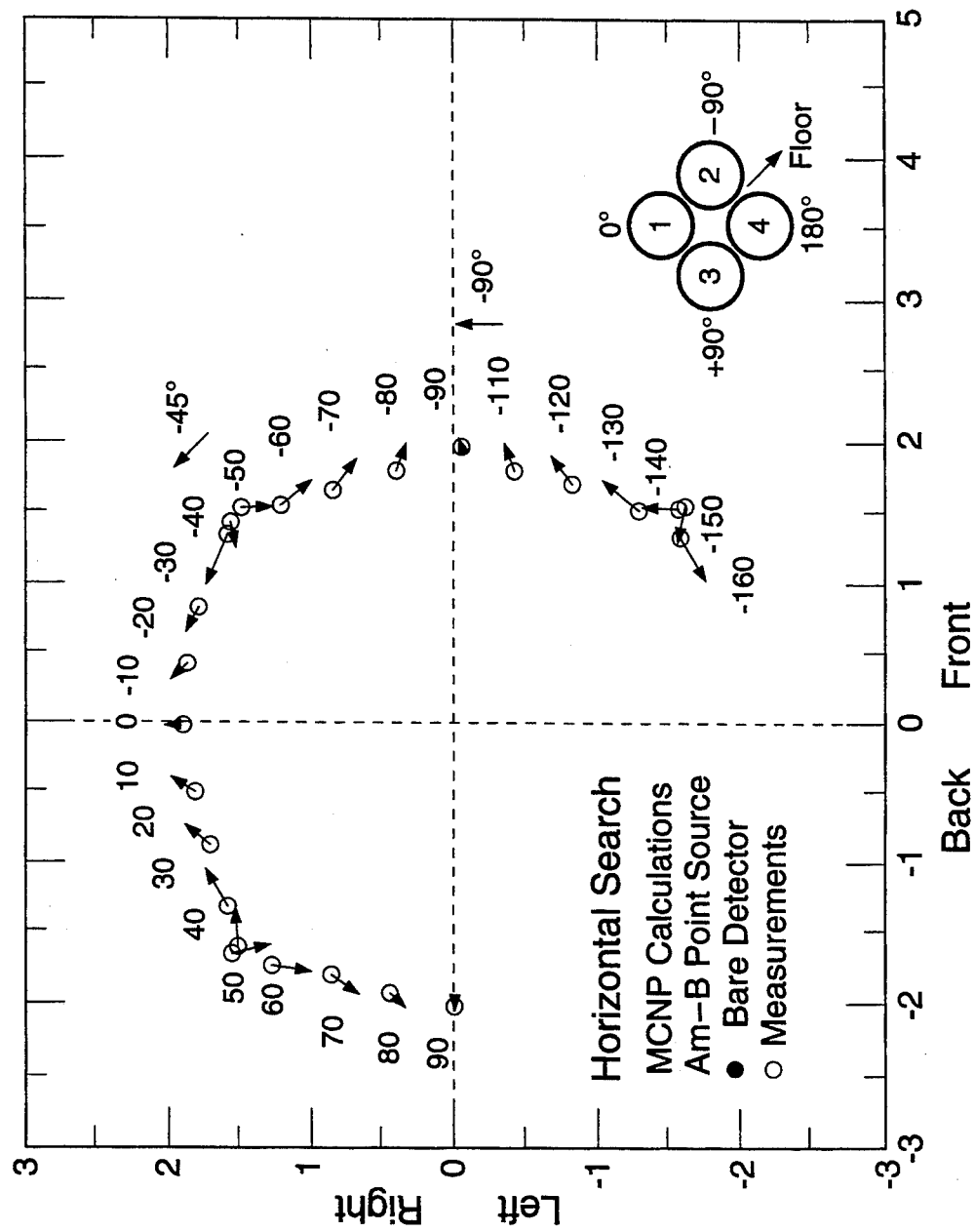
FIG. 4 graphically depicts the simulated performance of a detector as shown in FIG. 1 with a point radiation source.

FIG. 4 indicates similar results from a nearby point Am-B fast neutron source. The solid circles in FIG. 4 are outputs from an actual detector system using a point source to generally confirm the calculation results.

Figure 2:
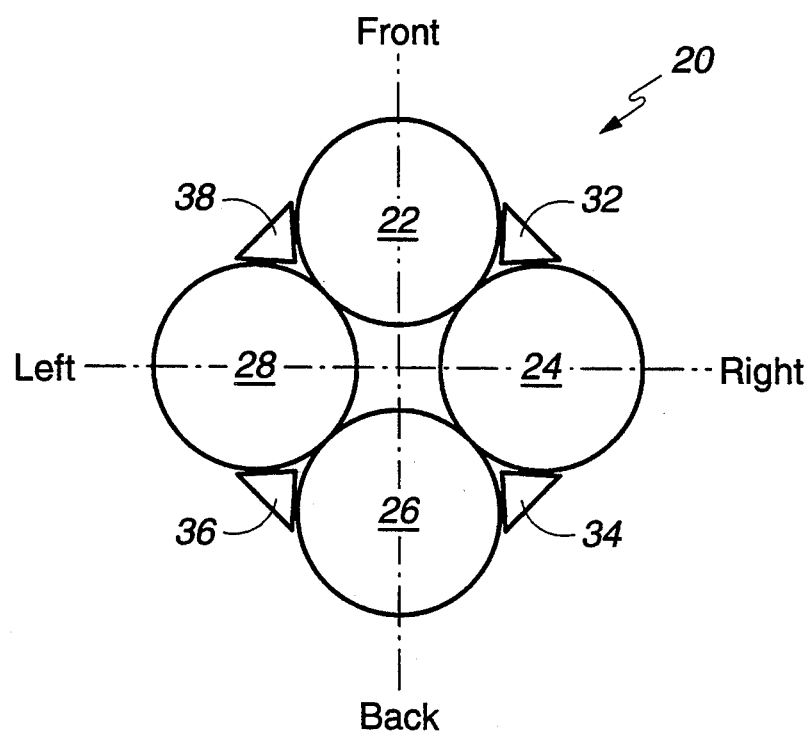
FIG. 2 is a pictorial illustration in cross-section of an embodiment of a directional detector.

FIG. 2 depicts an embodiment of segmented detector 20 that improves the accuracy of the measured direction near the 45° angles. Detectors 22 and 26 are paired along the front-back axis and detectors 24 and 28 are paired along the right-left axis as discussed for FIG. 1. Again, each detector axially abuts adjacent detectors to form a close packed arrangement. The errors around the 45° angles are associated with radiation transmission through the gap between the cylindrical detectors to detector elements located on the side of segmented detector 20 opposite the source location. To correct this problem, small shielding wedges 32, 34, 36, 38, e.g., polyethylene wedges, are placed within the gaps between adjacent ones of detectors 22, 24, 26, 28. The wedges are small enough to fit within a conventional enclosure for the detectors.

Figure 5:
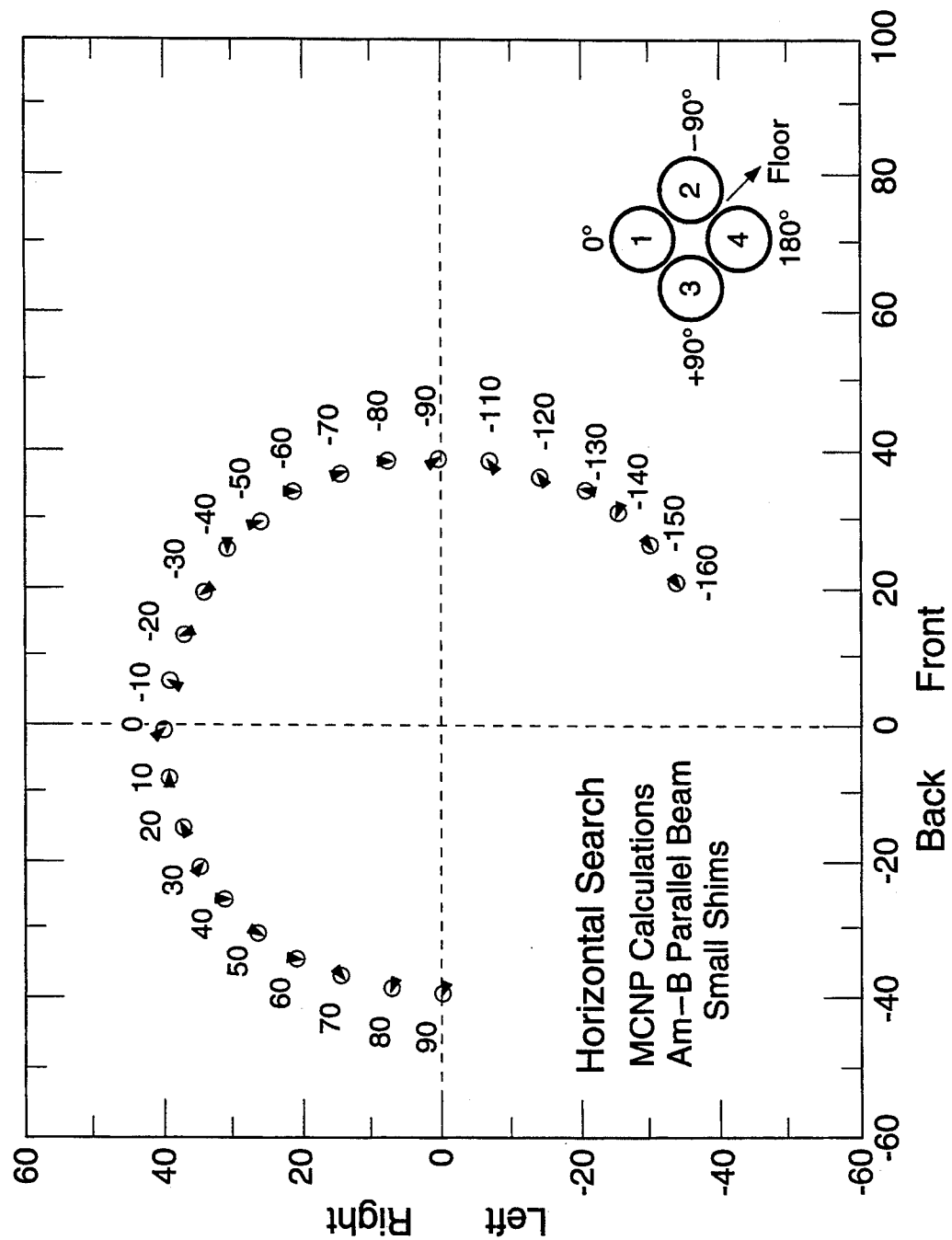
FIG. 5 graphically depicts the simulated performance of a detector as shown in FIG. 2 with a parallel beam radiation source.

The calculated accuracy of segmented detector 20 is shown in FIG. 5. The average deviation between the calculated source location and the actual source location is only slightly greater than the statistical uncertainty on the calculations.

Thus, an unshielded detector can be formed from only omnidirectional detector segments and used to provide quite accurate directional information on a radiation source about the outside of the detector. Collimation or other extensive shielding is not required to achieve directional information. Only a symmetric paired arrangement of the detectors is required where the difference in count rates from each pair forms a vector quantity for determining the source direction. While fast neutron detectors have been used herein, suitable omnidirectional detectors can be found for other types of radiation, e.g., gamma rays, x-rays, etc., to adapt the above teachings for locating source directions.

The foregoing description of the preferred embodiments of the invention have been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A radiation detector assembly effective for determining the direction of a fast neutron radiation source from said assembly, consisting essentially of:
    four omnidirectional fast neutron detectors arranged in a close-packed paired relationship with front-back and left-right symmetry to form a segmented symmetric detector; and
    processor means for arithmetically combining incident radiation counts from said plurality of detectors to output a signal functionally related to a direction of a source for said radiation.

2. A detector according to claim 1, wherein said means for combining said radiation counts comprises first means for subtracting said counts from said detectors having said front-back symmetry and second means for subtracting said counts from said detectors having said left-right symmetry, wherein outputs from said first and second means form a vector quantity indicating said direction for said source of said radiation.

3. A radiation detector assembly effective for determining the direction of a fast neutron radiation source from said assembly, consisting essentially of:
    four omnidirectional fast neutron detectors arranged in a closed-packed paired relationship with front-back and left-right symmetry to form a segmented symmetric detector;
    shielding segments located between adjacent ones of said neutron detectors to attenuate radiation passing between said adjacent ones of said detectors; and
    processor means for arithmetically combining incident radiation counts from said plurality of detectors to output a signal functionally related to a direction of a source for said radiation.

4. A detector according to claim 3, wherein said means for combining said radiation counts comprises first means for subtracting said counts from said detectors having said front-back symmetry and second means for subtracting said counts from said detectors having said left-right symmetry, wherein outputs from said first and second means form a vector quantity indicating said direction for said source of said radiation.

* * * * *